United States Patent
Hillier, III et al.

(10) Patent No.: US 7,970,980 B2
(45) Date of Patent: Jun. 28, 2011

(54) METHOD AND APPARATUS FOR ACCESSING MEMORY IN A COMPUTER SYSTEM ARCHITECTURE SUPPORTING HETEROGENEOUS CONFIGURATIONS OF MEMORY STRUCTURES

(75) Inventors: Philip Rogers Hillier, III, Rochester, MN (US); Joseph Allen Kirscht, Rochester, MN (US); Jamie Randall Kuesel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1592 days.

(21) Appl. No.: 11/013,149

(22) Filed: Dec. 15, 2004

(65) Prior Publication Data

US 2006/0129741 A1    Jun. 15, 2006

(51) Int. Cl.
*G06F 12/00* (2006.01)
*G06F 12/06* (2006.01)
*G06F 13/00* (2006.01)
*G06F 13/28* (2006.01)

(52) U.S. Cl. .................... 711/5; 711/154; 711/E12.078; 711/E12.081

(58) Field of Classification Search .............. 711/5, 154, 711/E12.078, E12.081
See application file for complete search history.

(56) References Cited

U.S. PATENT DOCUMENTS

| | | | | |
|---|---|---|---|---|
| 5,682,512 A * | 10/1997 | Tetrick | | 711/202 |
| 5,742,843 A * | 4/1998 | Koyanagi et al. | | 712/14 |
| 5,887,146 A * | 3/1999 | Baxter et al. | | 710/104 |
| 6,026,461 A * | 2/2000 | Baxter et al. | | 710/244 |
| 6,070,227 A * | 5/2000 | Rokicki | | 711/117 |
| 6,081,874 A * | 6/2000 | Carpenter et al. | | 711/141 |
| 6,088,770 A * | 7/2000 | Tarui et al. | | 711/148 |
| 6,243,794 B1 * | 6/2001 | Casamatta | | 711/153 |
| 6,292,705 B1 * | 9/2001 | Wang et al. | | 700/5 |
| 6,442,645 B1 * | 8/2002 | Freker | | 711/105 |
| 6,466,825 B1 * | 10/2002 | Wang et al. | | 700/5 |
| 6,546,453 B1 * | 4/2003 | Kessler et al. | | 711/5 |
| 6,546,471 B1 * | 4/2003 | Tarui et al. | | 711/148 |
| 6,567,900 B1 * | 5/2003 | Kessler | | 711/157 |
| 6,751,698 B1 * | 6/2004 | Deneroff et al. | | 710/317 |
| 6,823,429 B1 * | 11/2004 | Olnowich | | 711/141 |
| 6,941,440 B2 * | 9/2005 | Moll et al. | | 711/202 |
| 6,968,398 B2 * | 11/2005 | Davis et al. | | 710/3 |
| 6,996,675 B2 * | 2/2006 | Gilbert | | 711/128 |
| 2001/0027512 A1 * | 10/2001 | Hagersten | | 711/202 |
| 2002/0016899 A1 * | 2/2002 | West et al. | | 711/206 |
| 2003/0009640 A1 * | 1/2003 | Arimilli et al. | | 711/147 |
| 2003/0037185 A1 * | 2/2003 | Davis et al. | | 710/1 |
| 2003/0097539 A1 * | 5/2003 | Hagersten | | 711/203 |
| 2003/0177326 A1 * | 9/2003 | Luick | | 711/169 |
| 2003/0177335 A1 * | 9/2003 | Luick | | 711/210 |
| 2003/0233495 A1 * | 12/2003 | Moll et al. | | 710/1 |
| 2004/0044806 A1 * | 3/2004 | Moll et al. | | 710/3 |
| 2004/0123035 A1 * | 6/2004 | Gilbert | | 711/128 |
| 2004/0221072 A1 * | 11/2004 | Sano et al. | | 710/22 |
| 2005/0081080 A1 * | 4/2005 | Bender et al. | | 714/2 |

* cited by examiner

*Primary Examiner* — Shane M Thomas
*Assistant Examiner* — Matthew R Chrzanowski
(74) *Attorney, Agent, or Firm* — Roy W. Truelson

(57) ABSTRACT

A computer system includes at least one processor, multiple memory modules embodying a main memory, a communications medium for communicating data between the at least one processor and main memory, and memory access control logic which controls the routing of data and access to memory. The communications medium and memory access control logic are designed to accommodate a heterogenous collection of main memory configurations, in which at least one physical parameter is variable for different configurations. The bits of the memory address are mapped to actual memory locations by assigning fixed bit positions to the most critical physical parameters across multiple different module types, and assigning remaining non-contiguous bit positions to less critical physical parameters. In the preferred embodiment, the computer system employs a distributed memory architecture.

10 Claims, 10 Drawing Sheets

| DDR-II | Memory Address | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 |
| 256Mb(x4) | 0 | | | | CS | | | C11, C9 - C2 | | | | | | R12 - R0 | | | | | | | | | | | | | | | | | PORT | | C1-C0 | |
| 512Mb(x4) | 0 | | | | CS | | | C11, C9 - C2 | | | | | | R13 - R0 | | | | | | | | | | | | | | | B1 | B0 | PORT | | C1-C0 | |
| 1024Mb(x4) | 0 | | | CS | | | C11, C9 - C2 | | | | | | R13 - R0 | | | | | | | | | | | | | | | B2 | B1 | B0 | PORT | | C1-C0 | |
| 2048Mb(x4) | 0 | | CS | | | C11, C9 - C2 | | | | | | R14 - R0 | | | | | | | | | | | | | | | B2 | B1 | B0 | PORT | | C1-C0 | |

FIG. 7A

| DDR-II | Memory Address | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 |
| 256Mb(x4) | 0 | | | | CS | | | C11, C9 - C2 | | | | | | R12 - R0 | | | | | | | | | | | | | | | | | PORT | | C1-C0 | |
| 512Mb(x4) | 0 | | | | CS | | | C11, C9 - C2 | | | | | | R13 - R0 | | | | | | | | | | | | | | | B1 | B0 | PORT | | C1-C0 | |
| 1024Mb(x4) | 0 | | | CS | | | C11, C9 - C2 | | | | | | R13 - R0 | | | | | | | | | | | | | | | B2 | B1 | B0 | PORT | | C1-C0 | |
| 2048Mb(x4) | | | CS | | | C11, C9 - C2 | | | | | | R14 - R0 | | | | | | | | | | | | | | | B2 | B1 | B0 | PORT | | C1-C0 | | |

FIG. 7B

PRIOR ART

| DDR-II | Memory Address |||||||||||||||||||||||||||||||||||
|---|---|---|---|---|---|---|---|---|---|---|---|---|---|---|---|---|---|---|---|---|---|---|---|---|---|---|---|---|---|---|---|---|---|---|
| | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 |
| 256Mb(x4) | 0 ||||||| C7 - C2 |||||| C11 | R12-R10 ||| C9 | CS | R9 - R1 |||||||||| R0 | C8 | PORT | B1 | B0 | C1-C0 |
| 512Mb(x4) | 0 ||||||| | | | | R14 | | | | | | | | | | | | | | R13 | | | | |
| 1024Mb(x4) | 0 |||||| C8 ||||||||||||||||||| B2 ||||||
| 2048Mb(x4) | 0 |||| C9 |||||||||||||||||||||||||||

| DDR-II | Memory Address |||||||||||||||||||||||||||||||||||
|---|---|---|---|---|---|---|---|---|---|---|---|---|---|---|---|---|---|---|---|---|---|---|---|---|---|---|---|---|---|---|---|---|---|---|
| | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 |
| 256Mb(x4) | 0 |||||||| C8 - C3 |||||| C11 | R12-R10 ||| CS | R9 - R1 ||||||||| R0 | C9 | PORT | B1 | B0 | C1-C0 |
| 512Mb(x4) | 0 |||||||| | | | | | C2 | | | | | | | | | | | | | R13 | | | | |
| 1024Mb(x4) | 0 ||||||| C9 |||||| R0 |||||||||||||||| B2 ||||||
| 2048Mb(x4) | 0 || C2 | C11 ||||||||||||||||||||||||||||||

| DDR-II | Memory Address | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 |
| 256Mb(x4) | 0 | | | | | | | | | | C11 | C2 | | | | | C9 | R12-R10 | R13 | CS | | | | | | | | R9 - R1 | | R0 | PORT | | B1 | B0 | C1-C0 |
| 512Mb(x4) | 0 | | | | | | | | | C8 - C3 | | | | | | | | | | | | | | | | | | | | | | | | |
| 1024Mb(x4) | 0 | | C9 | | | | | | | | | | | | | | | | | | | | | | | | | | | | B2 | | | |
| 2048Mb(x4) | 0 | C2 | C11 | | | | | | | | | | | | | | | | | | | | | | | | | | | | | | | |

| DDR-II | Memory Address | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 |
| 256Mb(x4) | 0 | | | | | | | | | | C3 | C2 | | | | R13 | R12-R10 | CS | | | | | | | R9 - R1 | | | R0 | PORT | | B1 | B0 | C1-C0 |
| 512Mb(x4) | 0 | | | | | | | | | C9 - C4 | | | | | R0 | | | | | | | | | | | | | | | | | | | |
| 1024Mb(x4) | 0 | | C11 | | | | | | | | | | | | | | | | | | | | | | | | | | | | B2 | | | |
| 2048Mb(x4) | C3 | C2 | | | | | | | | | | | | | | | | | | | | | | | | | | | | | | | | |

| DDR-II | Memory Address | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 |
| 256Mb(x4) | 0 | | CS | | | | | C9 | C7 | C5 - C2 | | | | | | R12 | R13 | R0, R11 - R1 | | | | | | | | | | C8 | C6 | PORT | B2 | B1 | B0 | C1-C0 |
| 512Mb(x4) | 0 | | CS | | | | | | | | | | | | | | | | | | | | | | | | | | | | | | | |
| 1024Mb(x4) | 0 | | CS | | | C11 | | | | | | | | | | | | | | | | | | | | | | | | | | | | |
| 2048Mb(x4) | 0 | CS | | | R14 | | | | | | | | | | | | | | | | | | | | | | | | | | | | | |

FIG. 9A

| DDR-II | Memory Address | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 |
| 256Mb(x4) | 0 | | CS | | | | | | C9 | C7 - C2 | | | | | | R12 | R13 | R0, R11 - R1 | | | | | | | | | | C8 | PORT | B2 | B1 | B0 | C1-C0 | |
| 512Mb(x4) | 0 | | CS | | | | | | | | | | | | | | | | | | | | | | | | | | | | | | | |
| 1024Mb(x4) | 0 | CS | | | | C11 | | | | | | | | | | | | | | | | | | | | | | | | | | | | |
| 2048Mb(x4) | CS | | | R14 | | | | | | | | | | | | | | | | | | | | | | | | | | | | | | |

FIG. 9B

METHOD AND APPARATUS FOR ACCESSING MEMORY IN A COMPUTER SYSTEM ARCHITECTURE SUPPORTING HETEROGENEOUS CONFIGURATIONS OF MEMORY STRUCTURES

FIELD OF THE INVENTION

The present invention relates to digital data processing hardware, and in particular to the design and operation of addressing mechanisms for accessing real memory in a digital data processing system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPUs) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of all of the various components simultaneously. E.g., if everything runs twice as fast but otherwise works in exactly the same manner, the system will perform a given task in half the time. Early computer systems contained processors which were constructed from many discrete components. These systems were susceptible to significant clock speed improvements by shrinking and combining components, eventually packaging the entire processor as an integrated circuit on a single chip.

Simply improving the speed of a single component will not necessarily result in a corresponding increase in system throughput. The faster component may find itself idle while waiting for some slower component most of the time.

A computer's CPU operates on data stored in the computer's addressable main memory. The memory stores both the instructions which execute in the processor, and the data which is manipulated by those instructions. In operation, the processor is constantly accessing instructions and other data in memory, without which it is unable to perform useful work. In recent years, improvements to processor speed have generally outpaced improvements to the speed of accessing data in memory. The time required to access this data is therefore a significant factor affecting system throughput.

Memory is typically embodied in a set of integrated circuit modules. The time required to access memory is not only a function of the operational speed of the memory modules themselves, but of the speed of the path between the processor and memory. As computers have grown more complex, this path has consumed a larger share of the access time. Early computers had but a single processor and a relatively small memory, making the path between processor and memory relatively direct. Large modern systems typically contain multiple processors, multiple levels of cache, complex addressing mechanisms, and very large main memories to support the data requirements of the system. In these systems, it is simply not possible for direct paths to exist from every processor to every memory module. Complex bus structures support the movement of data among various system components. Often, data must traverse several structures between the processor and the actual memory module. As the number of processors and size of memory grows, this problem becomes more acute.

One architectural approach that has gained some favor in recent years is the design of computer systems having discrete nodes of processors and associated memory, also known as distributed shared memory computer systems or non-uniform memory access (NUMA) computer systems. In a conventional symmetrical multi-processor (SMP) system, main memory is designed as a single large data storage entity, which is equally accessible to all CPUs in the system. As the number of CPUs increases, there are greater bottlenecks in the buses and accessing mechanisms to such main memory. A NUMA system addresses this problem by dividing main memory into discrete subsets, each of which is physically associated with a respective CPU, or more typically, a respective group of CPUs. A subset of memory and associated CPUs and other hardware is sometimes called a "node". A node typically has an internal memory bus providing relatively direct access from a CPU to a local memory within the node. Indirect mechanisms, which are slower, exist to access memory across node boundaries. Thus, while any CPU can still access any arbitrary memory location, a CPU can access addresses in its own node faster than it can access addresses outside its node (hence, the term "non-uniform memory access"). By limiting the number of devices on the internal memory bus of a node, bus arbitration mechanisms and bus traffic can be held to manageable levels even in a system having a large number of CPUs, since most of these CPUs will be in different nodes.

Another design requirement of modern computer systems is flexibility of configuration, i.e., the ability to re-configure the system by adding or re-assigning hardware to handle changing work requirements. A modern multi-processor system architecture typically supports a variable number of processors and memory modules. A system which is configured with a minimum number of such modules can be expanded by adding processors, memory and associated hardware, up to some architecturally defined limit. Simply adding processors and memory to a system sharing a single bus will increase bus contention to the point where the bus is a major bottleneck.

Because a NUMA system isolates most of its bus traffic in discrete nodes, it is generally considered more expandable (has increased "scalability" for a large number of processors) than a conventional SMP system.

Due to the need to support hardware configuration upgrades, many large system architectures, whether of a NUMA, SMP or other type, support a heterogeneous mixture of memory modules. I.e., modules of different sizes, bus interface widths, and other parameters are supported.

Unfortunately, flexibility comes at a price. The use of different types of memory modules necessarily increases the complexity of the structures which must interface with the memory. For example, each memory integrated circuit chip has a certain number of rows and columns of memory cells, the number being variable for different types of memory chips. These chips are generally mounted on cards, which may again have differing numbers of modules arranged differently. Depending on types of modules used and their arrangement, the card may internally be divided into banks of different size and configuration, making it possible to access multiple addresses from different banks concurrently. The cards will output data of a certain width through an external interface, the width potentially varying with different memory module types and/or bus configurations.

Conventionally, contiguous bit positions of a real address in memory are allocated to rows, columns, internal banks, modules, and so forth, of memory. This works well if all modules have the same number of rows, columns, etc. But where a heterogenous set of modules is used, address bits of real memory have different significance depending on the memory module type. Somewhere, there must be logic within the system which receives a data address in memory and determines just how to retrieve the data, given the multiple configurations possible. As the number of possible configurations increases, this logic increases in complexity, potentially causing further delay in accessing memory.

A need exists for improved interface techniques for transferring data between processors and memory in a computer system. In particular, a need exists for an improved architectural interface to memory, which supports a heterogenous collection of memory modules.

SUMMARY OF THE INVENTION

A computer system includes at least one processor, multiple memory modules embodying a main memory, a communications medium for communicating data between the at least one processor and main memory, and memory access control logic which controls the routing of data through the communications medium and access to memory modules. The communications medium and memory access control logic are designed to accommodate a heterogenous collection of memory module configurations embodying the main memory, in which at least one physical parameter, such as the number of rows, number of columns, number of ports, number of internal banks, data interface width, and burst length, is variable for different configurations of the heterogeneous collection. The bits of the memory address are mapped to actual memory locations by assigning fixed bit positions to the most critical physical parameters across multiple different module types, and assigning remaining non-contiguous bit positions to less critical physical parameters.

In the preferred embodiment, the computer system is designed according to a non-uniform memory access (NUMA) architecture containing multiple nodes, each node including at least one processor and a local memory, although alternatively other architectures could be used. A portion of the local memory in each node is allocated to a respective portion of main memory, while the remaining portion of local memory is used as a cache of main memory contained in other nodes. A real memory address, having a system-wide meaning, is translated in the local node to a local real memory address, also referred to as a "physical memory address", which is a local address referring to the local memory of a node.

In the preferred embodiment, the memory access control logic supports two alternative memory address mappings: a general map and a performance map. The general map has greater flexibility of configuration options; the performance map is more constrained with respect to configuration options, allowing the use of simplified decode logic which is generally faster. In the performance map, the most critical physical parameters are a memory port, a chip group identifier and an internal bank identifier. These are decoded in advance of the decode of row and column, to allow comparison with commands in progress to determine whether a memory access can be started immediately. These are assigned consistent address bits across a wide range of configurations. The next most critical physical parameter is a row number, as decoding the row number permits to row access logic to initialize. Most address bits for these parameters are assigned consistent positions, to reduce the complexity of decode logic needed. The column address bits are least critical, but certain column address bits are still assigned consistent positions to simplify the logic required.

By assigning selective physical memory parameters to consistent address bits across a wide range of memory configurations, according to the preferred embodiment, the logic required for decoding a memory address in a memory controller is reduced along certain critical paths, reducing the delay in accessing memory and improving the performance of a computer system.

The details of the present invention, both as to its structure and operation, can best be understood in reference to the accompanying drawings, in which like reference numerals refer to like parts, and in which:

BRIEF DESCRIPTION OF THE DRAWING

FIGS. 7A and 7B represent a partial set of mappings of address to physical memory parameters using a prior art mapping technique.

FIGS. 8A-8D represent a partial set of mappings of address to physical memory parameters using a performance mapping, according to the preferred embodiment.

FIGS. 9A-9B represent a partial set of mappings of address to physical memory parameter using a general mapping, according to the preferred embodiment.

DETAILED DESCRIPTION OF THE PREFERRED EMBODIMENTS

Figure 1:
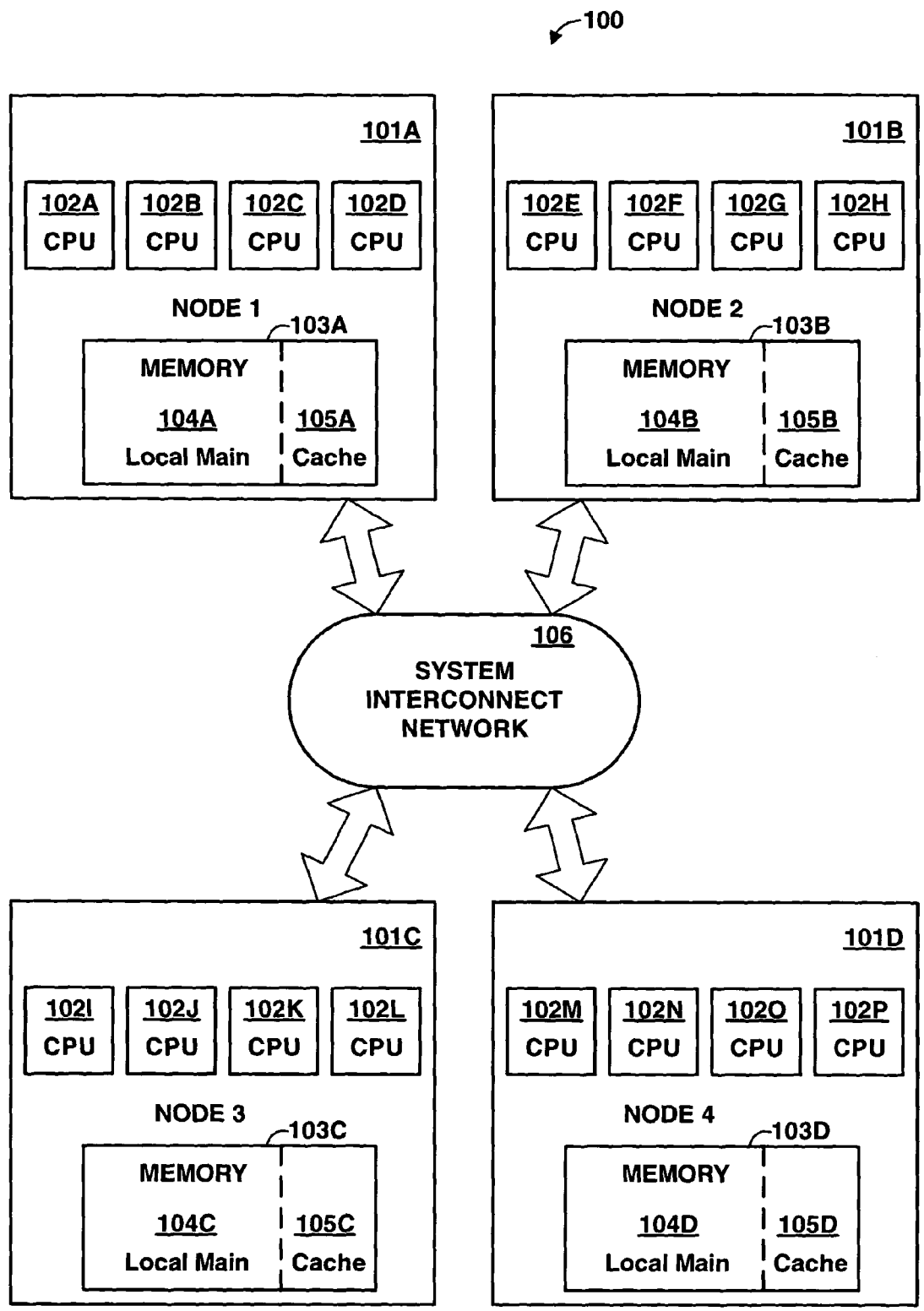
FIG. 1 is a high-level block diagram of the major hardware components of a multi-node, multi-processor computer system, according to the preferred embodiment of the present invention.

Referring to the Drawing, wherein like numbers denote like parts throughout the several views, FIG. 1 is a high-level block diagram of the major hardware components of a multi-node, multiprocessor computer system 100 in accordance with the preferred embodiment of the present invention. Computer system 100 is designed according to a NUMA architecture, it being understood that a computer system in accordance with the present invention need not necessarily be a NUMA system. Computer system 100 comprises multiple nodes 101A-101D (herein generically referred to as feature 101), of which four are shown in the exemplary system of FIG. 1, it being understood that the number of nodes may vary. Each node includes multiple general-purpose programmable central processing units (CPUs) 102A-102P (herein generically referred to as feature 102) and a local memory 103A-103D (herein generically referred to as feature 103). Each local memory 103 is allocated between a local main memory portion 104A-104D (herein referred to generically as feature 104) and a remote memory cache 105A-105D (herein referred to generically as feature 105).

Computer system 100 utilizes a distributed main memory, comprising a separate local main memory portion 104A-104D in each respective node 101A-101D. Collectively, local main memory portions 104A-104D constitute the main memory of computer system 100. The main memory is addressable using a single common real address space, which is shared by all CPUs throughout the system. A respective portion of the real address space is allocated to each local memory portion 104A-104D in a persistent, fixed manner. I.e., the address space allocation does not change with each task, process, user, or similar parameter, although it may be possible to change the allocation by reconfiguring the system. Thus, the real address space of main memory is constant across the entire system, and any memory location in a local memory 104 has a unique real address which is the same for all processors and all nodes.

The nodes are connected to one another by an inter-node communications network 106 that permits any node to communicate with any other node. The purpose of inter-node communications network is to allow devices to communicate across node boundaries, and in particular, to allow a processor in any node to access the memory resident in any other node. Inter-node communications network 106 may employ any technique, now known or hereafter developed, for supporting communication among multiple nodes in a computer system. Ideally, the inter-node communications medium should provide high bandwidth and low latency, and be scalable to allow for the addition of more nodes. Network 106 may be arranged as a set of point-to-point interconnection links, as a ring topology, as a common multi-drop bus topology, or in some other manner. Connections may be wired or wireless (e.g, optical), depending on system performance needs. As just one example, network 106 may be a switch-based network that uses the Scalable Coherent Interface (SCI) interconnection mechanism conforming to the IEEE 1596-1992 or subsequent standard. SCI is a high-bandwidth interconnection network implemented by a pumped bus that sends packets on each individual point-to-point interconnect.

In the preferred embodiment, a portion of local memory 103 is allocated to a remote memory cache 105 for temporarily storing some of the data from local main memories in other nodes. Remote memory cache 105 improves memory access time because access by a processor 102 to a local main memory portion within another node is significantly slower than access to the local memory 103 of the processor's node. Since part of each local memory 103 is allocated to cache 105, it is not possible to directly access local memory using a system-wide real address. The system-wide real address is therefore translated to a local real address, also called a "physical memory address", by a memory controller in each local node, as explained in greater detail herein.

Figure 2:
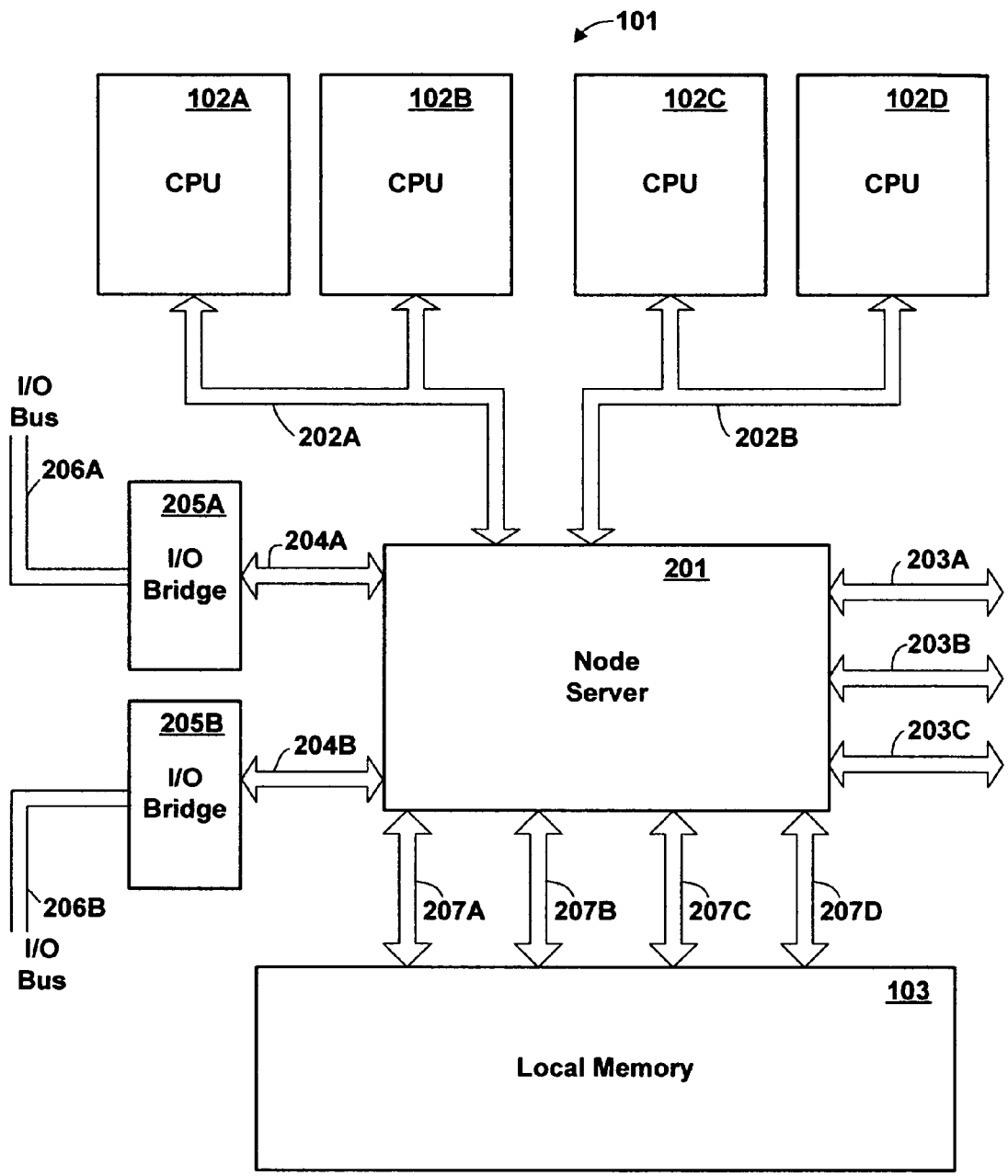
FIG. 2 is a high-level block diagram of the major hardware components of a typical node of a multi-node computer system of the preferred embodiment.

FIG. 2 is a block diagram of the major hardware components of a typical node 101 of computer system 100 in accordance with the preferred embodiment. Node 101 includes one or more central processing units (CPUs) 102 (of which four are shown in FIG. 2), a local portion of main memory 103, and a node server 201, which functions as a communications and memory control device. A node may optionally include one or more I/O bridge units 205A-205B (herein generically referred to as feature 205), of which two are shown in FIG. 2. A pair of local processor buses 202A, 202B (herein generically referred to as feature 202) connects the CPUs 102 with node server 201. Three inter-node communication links 203A-203C (herein generically referred to as feature 203) couple respective inter-node communication ports (referred to as scalability ports) in node server 201 with corresponding ports in other nodes. A pair of local I/O buses 204A, 204B (herein generically referred to as feature 204) connects I/O bridge units 205 with node server 201. A set of four local memory buses 207A-207D (herein referred to generically as feature 207) connect memory 103 with node server 201. Physically, node 101 is preferably implemented as multiple integrated circuit chips mounted on as single circuit card, having embedded printed circuit connections running among the various chips.

Each CPU 102 performs basic machine processing functions on instructions and other data from the distributed main memory. Each CPU preferably contains or controls a respective set of caches (not shown) for temporary storage of data and instructions, some of which may be shared among more than one CPU. For example, each CPU may contain a respective level 1 instruction cache (L1 I-cache) and a respective level 1 data cache (L1 D-cache) while a lower level cache such as an L2 or L3 cache might be shared by more than one CPU. In the preferred embodiment, a processor 102 and the caches it contains are constructed on a single semiconductor integrated circuit "chip", sometimes called a "processor chip". In some embodiments, a single chip may contain more than one processor.

Local processor buses 202 couple the CPUs 102 and their associated caches to node server 201. Although represented in FIG. 2 as simple multi-drop buses, local processor buses 202 may be constructed according to any of various architectures, now known or hereafter developed.

Each I/O bridge unit 205 provides an interface to a respective I/O bus 206A-206B (herein generically referred to as feature 206), and is coupled to node server via a local I/O bus 204. Each I/O bus 206 connects one or more I/O devices (not shown) to node 101. I/O devices may include any of various devices, such as direct access storage devices, tape drives, workstations, printers, and remote communications adapters for communications with remote devices or with other computer systems through dedicated communications lines or networks. The number and range of I/O devices may vary considerably, and may include devices hereafter developed. I/O bridge unit 205 provides an interface between two different buses 204 and 206, and provides buffering and other necessary functions for interfacing different buses which may be operating at different speeds, data widths, protocols, etc.

Node server 201 functions as a communications and memory control device. The node server provides a central point of control for data flowing into and out of node 101, and between certain functional units within node 101. In particular, node server 201 translates system-wide real memory addresses to local "physical memory addresses" for use in accessing local memory 103. The function of node server 201 is explained in further detail herein.

Local memory 103 is coupled to node server 201 via local memory buses 207. Local memory 103, while represented as a single monolithic entity in FIGS. 1 and 2, is in fact generally constructed as multiple integrated circuit chips and other components, as explained in further detail with respect to FIG. 3 below. Local memory buses 207 collectively comprise a communications medium coupled to all such chips, and may be constructed according to any conventional technique or any technique hereafter developed.

Node server 201 of the preferred embodiment contains physical ports for supporting up to two processor buses 202, three inter-node communication links 203, two local I/O buses 204, and four local memory buses 207. However, it is not necessary that all such ports be utilized in any particular configuration, and some system configurations may use fewer than all available ports. Furthermore, a node server might have a different number of ports for processors, inter-node links, local I/O buses and/or local memory buses.

While a system having four nodes is shown in FIG. 1, and a typical node having four CPUs and various other devices is shown in FIG. 2, it should be understood that FIGS. 1 and 2 are intended only as a simplified example of one possible configuration of a system for illustrative purposes, that the number and types of possible devices in such a configuration may vary, and that the system often includes additional devices not shown. It should further be understood that it is not required that all nodes be identical, that all nodes have the same number of CPUs or the same amount of addressable local memory, or that all nodes have attached I/O buses and I/O devices. Finally, although the system of the preferred embodiment is a multi-node system employing a NUMA architecture, the present invention might be utilized in systems designed according to different architectural principles, or in a system having only a single node. While various system components have been described and shown at a high level, it should be understood that a typical computer system contains many other components not shown, which are not essential to an understanding of the present invention.

Figure 3:
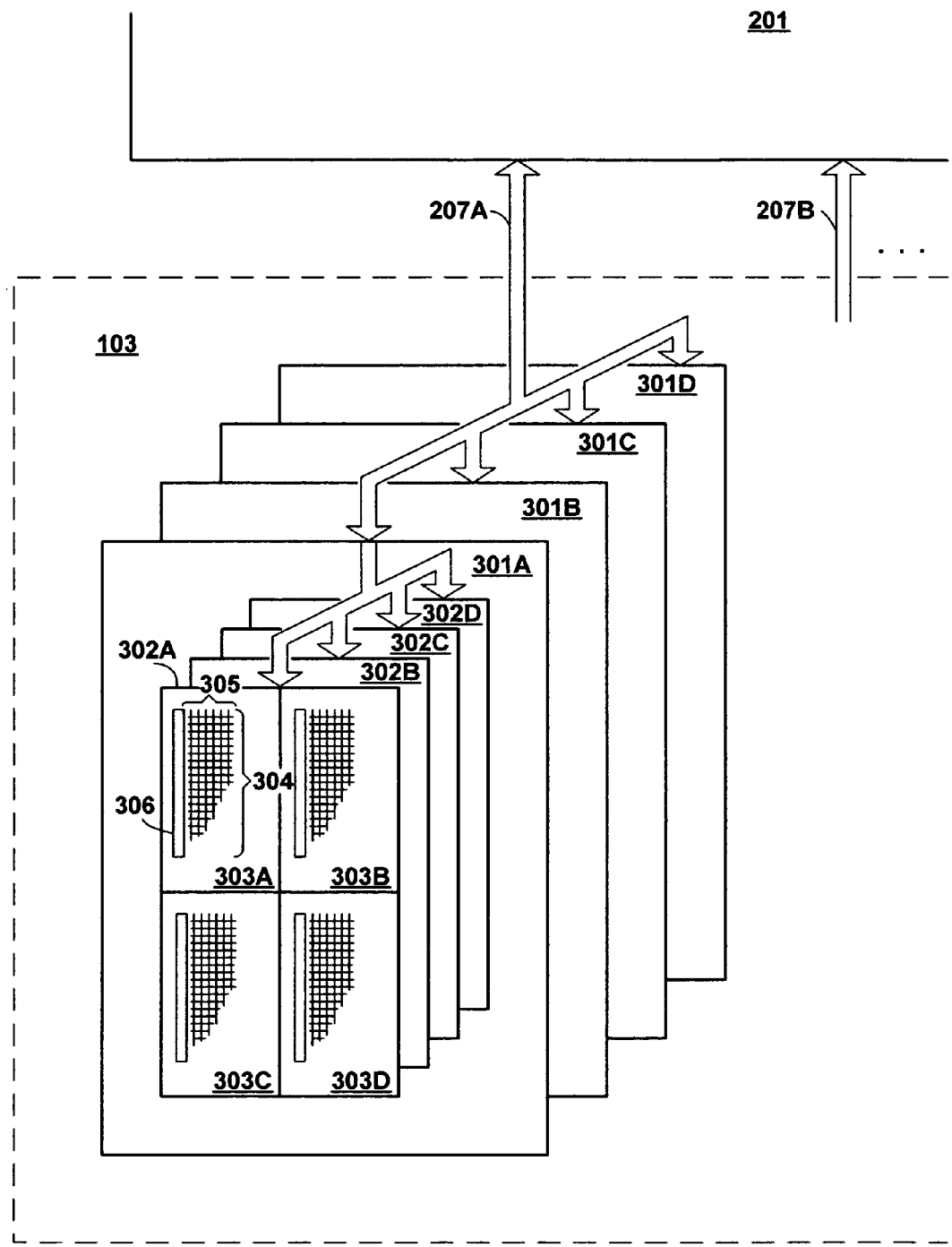
FIG. 3 is a representation of the hierarchy of hardware elements which form the physical local memory within a node, according to the preferred embodiment.

FIG. 3 represents in greater detail the hierarchy of hardware elements which form physical local memory 103 within a node 101, according to the preferred embodiment. As explained above, node server 201 supports multiple local memory buses 207A-207D, of which two are shown in FIG. 3. Each local memory bus provides a data path from node server 201 to one or more respective chip select groups 301A-301D (herein referred to generically as feature 301), of which four are represented in FIG. 3 attached to local memory bus 207A, it being understood that the actual number of such chip select groups may vary, and that a different number of such groups may be attached to each local memory bus. Each chip select group 301 contains one or more integrated circuit chips 302A-302D, of which four are represented in FIG. 3, it being understood that the actual number of such chips may vary. Typically, chips 302 are dynamic random access (DRAM) memory chips, and a chip select group 301 is physically implemented as a printed circuit card on which multiple chips 302 are mounted. However, the present invention is not limited to any particular memory chip technology or other physical implementation, and it will be appreciated that in the future new memory module technologies or methods of grouping memory modules may be employed in accordance with the present invention. In the preferred embodiment, the chip select group 301 is the smallest physically replaceable unit of memory, and all chips 302 within a single chip select group have consistent parameters. The parameters of different chip select groups attached to the same or a different local memory bus are not necessarily consistent.

Each memory chip 302 is physically organized as one or more internal banks 303A-303D, of which four are shown in FIG. 3, it being understood that the actual number of such banks may vary. Each internal bank 303 contains multiple memory cells organized in an array of rows 304 and columns 305, as is known in the art. Each internal bank 303 further contains its own row access logic 306 which can access any arbitrary row within the bank independently of rows being accessed by row access logic within other internal banks of the same memory chip.

Figure 4:
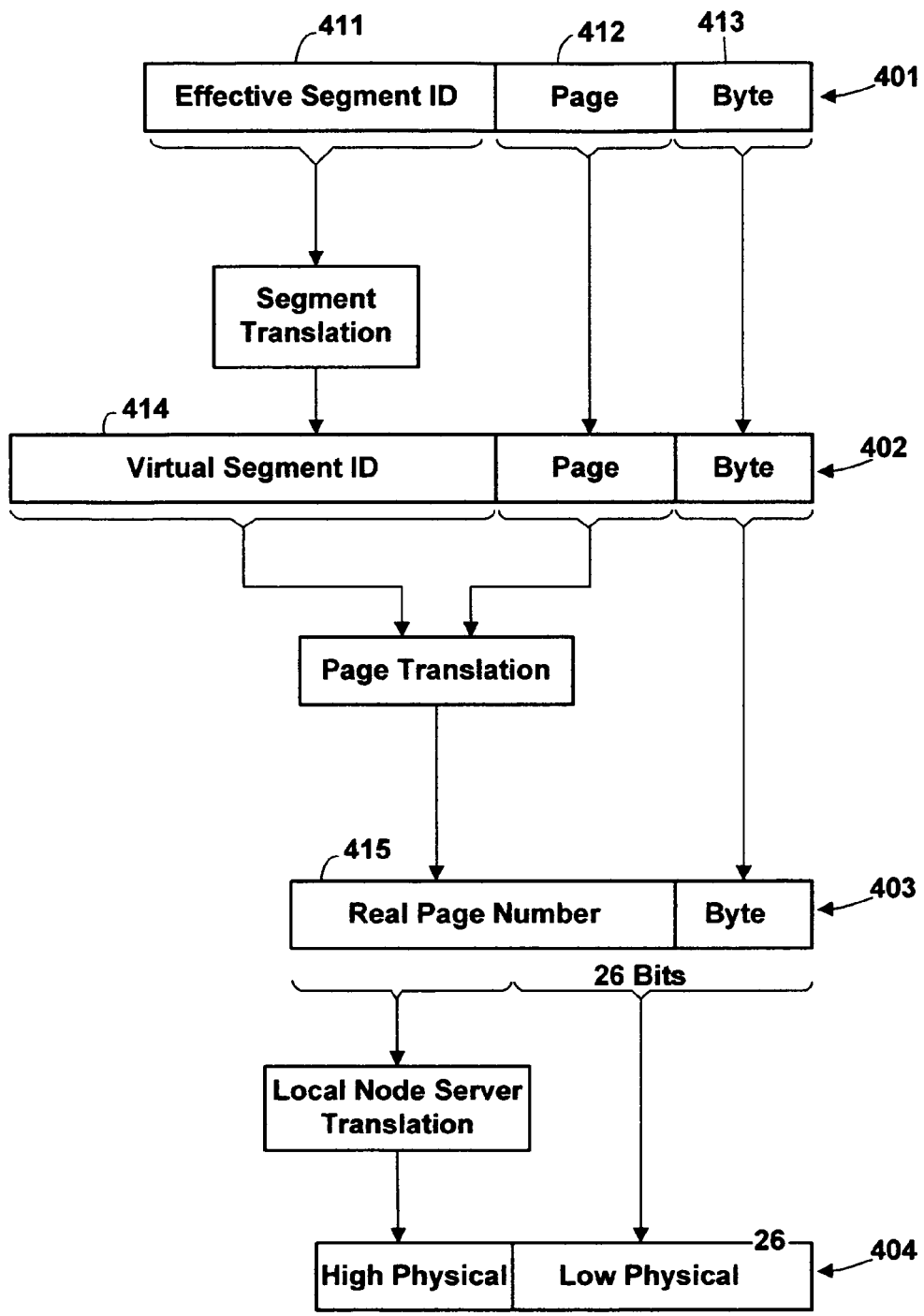
FIG. 4 is a conceptual illustration of different forms of addresses and address translation supported in the computer system of the preferred embodiment.

System 100 of the preferred embodiment supports multiple levels of address translation, as logically illustrated in FIG. 4. Four basic addressing constructs are effective address 401, virtual address 402, real address 403, and physical address 404, the latter two being of particular significance in memory mapping performed by node server 201. An "effective address" is an address from the point of view of the processor's instruction and execution units. I.e., addresses generated internally within a processor 101 by a processor's instruction unit or execution unit to reference instructions or data are effective addresses. An effective address may be produced in any of various ways known in the art, e.g., as an address directly encoded in an instruction (which may or may not be concatenated with some high-order address bits in a special-purpose register which changes infrequently, e.g., when execution of a new task is initiated); as a computed offset from an address in a general purpose register; as an offset from the currently executing instruction; etc. An optional "virtual address" is an operating system construct used in some system architectures to isolate the address spaces of different executing tasks. I.e., if each task may reference the full range of effective addresses, then the effective address spaces of different tasks must be mapped into a larger virtual address space to avoid conflicts. The virtual address is not necessary stored in registers like the effective address, but is a logical construction. A real address represents a unique location in the system's main memory. The main memory is physically embodied as a conglomeration of local memories 103. Because the real address is unique, a real address effectively specifies both a node and a memory location within the node. The physical address is a memory location which is local to a particular node (and therefore there may be multiple instances of the same physical address on the system, each in a different node). The low order 26 bits of a real address are the same as the low order 26 bits of a physical address. The higher order bits of real address are mapped to the higher order bits of physical address in a local physical memory location; the number of bits of physical address may be the same as or different from the number of real address bits. The number of real address bits and physical address bits will vary with particular machines, but is generally significantly fewer than the number of effective address bits or virtual address bits. In the preferred embodiment, the memory controller supports a real address up to 40 bits, although fewer than all bits might be used in any particular configuration.

As shown in FIG. 4, an effective address 401 comprises an effective segment ID 411, a page number 412, and a byte index 413, the effective segment ID occupying the highest order bit positions. A virtual address 402 is constructed from an effective address by mapping the effective segment ID 411 to a larger virtual segment ID 414, and concatenating the resultant virtual segment ID 414 with page number 412 and byte index 413. A real address 403 is derived from the virtual address by mapping the virtual segment ID 414 and page number 412 to a real page number 415, and concatenating the real page number with byte index 413.

In the preferred embodiment, the mappings of effective-to-virtual and virtual-to-real addresses or directly from effective-to-real addresses are performed by the processors 101 using translation look-aside buffers and similar mechanisms (not shown). When a processor requests data from memory over processor bus 202, it transmits the real address of the requested data. If the requested data must be retrieved from another node, the real address is likewise transmitted across inter-node communication links 203. The node server 201 in the local node where the memory is physically located sees only the real address, and translates the real address to a physical address.

Figure 5:
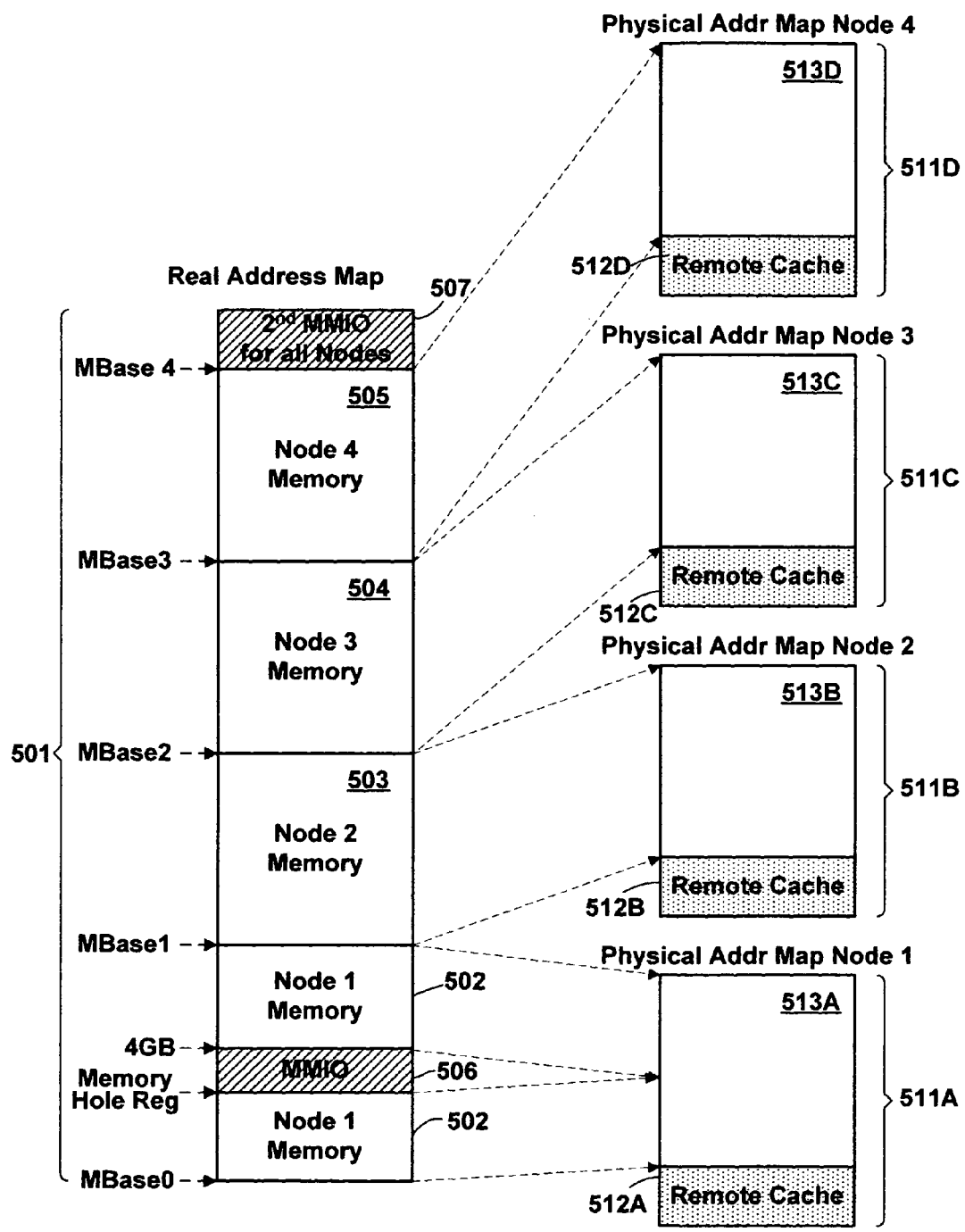
FIG. 5 is a conceptual representation of a mapping of system real address space to local node physical address spaces, according to the preferred embodiment.

FIG. 5 represents a mapping of the system real address space to local node physical address spaces in the system of the preferred embodiment. Real address space 501 is segmented into multiple local memory portions 502-505, each corresponding to a local memory of a respective node. The local memory portion 502 for the first node, occupying the lowest portion of the real memory address space, comprises two non-contiguous segments separated by memory mapped I/O (MMIO) space 506. MMIO space 506 is a portion of real memory reserved for memory-mapped I/O operations, and therefore not physically present in any of the local memories 103. In the preferred embodiment, the bottom boundary of MMIO space is store in a configurable memory hole register, and the top boundary is fixed at 4 GB. The boundaries between the various local memory portions of real address space are stored in a configurable set of memory base registers. A portion of real memory 507 above the highest local memory portion may also be used for memory mapped I/O.

Each node contains its own physical address space 511A-511D (herein referred to as feature 511), which begins at address 0. The lower portion 512A-512D (herein referred to as feature 512) of each node's physical address space 511 is reserved for use as a remote cache. The size of remote cache is variable within certain constraints. The upper portion 513A-513D (herein referred to as feature 513) of each node's physical address space is allocated as a main memory portion corresponding to local portion 502-50S of real memory. Since the lower 26 bits of physical address are the same as the lower 26 bits of real address, the boundaries between various local memory portions of real address space and between remote caches 512 and main memory portions 513 must occur at intervals in which the 26 low order bits are zeroes (i.e., 64 MByte boundaries).

After adjusting for boundaries, the local memory portions 502-505 of the real address space map directly into local memory portions 513A-513D of each physical address space 511A-511D. For example, from a conceptual standpoint, to translate a real address within local portion 503 of real address space to a corresponding physical address, one would determine the correct node from the MBase registers, subtract the value of MBase1 register (defining the boundary between local memory portions 502 and 503) from the real address, and add the size of remote cache 512B to the result. In reality, the hardware which performs this translation does not necessarily perform successive subtractions and additions, and may compare selective bits from addresses and registers to make the correct determinations.

Although a particular addressing scheme is described herein as a preferred embodiment, it will be understood that many variations in addressing schemes are possible. Some systems do not have a separate effective address space and virtual address space, using a combined construct (which may be called "virtual", "effective", or by some other name). Furthermore, some systems, particularly systems which do not employ a nodal architecture as described herein, do not have a separate real address space and physical address space, the real address space (or some similar construct) being used directly to address memory. The sizes of address spaces, page sizes, and other parameters may vary.

Figure 6:
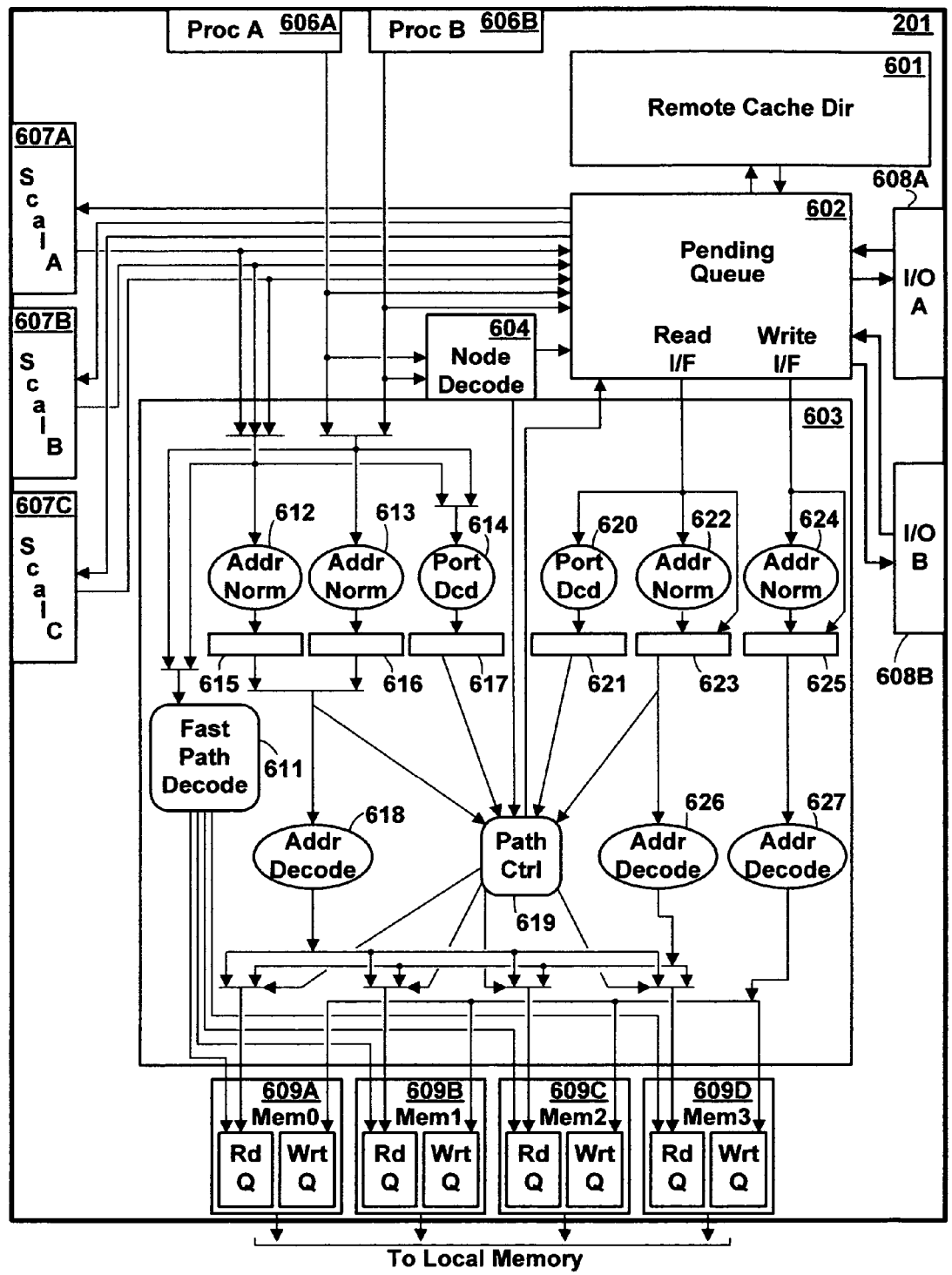
FIG. 6 represents certain major hardware components and data paths of a node server which decodes memory addresses, according to the preferred embodiment.

FIG. 6 represents certain major hardware components and data paths of node server 201, and in particular represents components and data paths for handling and decoding memory access requests directed to local memory in the node of node server 201, according to the preferred embodiment. Node server 201 includes remote cache directory 601, pending queue 602, address translation logic 603, and node decode logic 604. Remote cache directory 601 contains a directory of the current contents of remote cache portion 512 of local memory. Pending queue 602 temporarily enqueues memory access requests. Address translation logic 603 translates incoming real addresses of memory to be accessed to corresponding physical addresses, and further maps these physical addresses to physical features of memory, such as port number, chip select group, internal bank, row and column. Node decode logic 604 (which may logically be considered part of address translation) determines the node of a data access request from the real address. Node server 201 further includes multiple ports for external communication, in particular: a pair of processor ports 606A,606B (herein referred to generically as feature 606) for coupling to respective processor buses 202A, 202B; three scalability ports 607A-607C (herein referred to generically as feature 607) for coupling to respective inter-node communication links 203A-203C; a pair of I/O ports 608A, 608B (herein referred to generically as feature 608) for coupling to respective local I/O buses 204A, 204B; and four local memory ports 609A-609D (herein referred to generically as feature 609), for coupling to respective local memory buses 207A-D. Node server 201 further includes various other logic and memory structures for supporting intra-nodal and inter-nodal data communications, maintaining state information, buffering data, and so forth, which are not essential to an understanding of the present invention, and which have been omitted from FIG. 6 for clarity of representation.

Among other things, node server 201 provides communication means among the various components of node 101, and between components of node 101 and devices (particularly, other nodes) external to node 101. In particular, node server 201 accesses data in local memory 103 on behalf of requesting devices. A requesting device might be a processor 102 attached to a local processor bus 202 within the same node, or an I/O device attached to an I/O bus 206 driven by an I/O bridge unit 205 attached to a local I/O bus in the same node. A requesting device might also be a processor within or I/O bus attached to a different node, in which case the request will be received by node server 201 over an inter-node communication link 203. A memory access request received by node server 201 includes a real address of the data to be accessed. Node server 201 determines whether the requested data exists within local memory 103, translates the real address to a physical address for accessing local memory 103, and drives the memory access on a local memory bus 207. If the requested data does not exist in local memory 103, the node server determines the node in which the data resides and forwards the request to the corresponding node over an appropriate inter-node communication link 203. Where possible, the request is forwarded directly to the node in which the data resides. Because there are only three inter-node communication links (which are, in the preferred embodiment, point-to-point links), in configurations containing more than four nodes it may be necessary to forward a request serially through multiple nodes; logic required for forwarding through a node is not shown in FIG. 6.

Node server 201 provides three alternative data paths for memory access requests, herein referred to as a performance path, a direct path and a queued path. The performance path and the direct path are used only for some (but not all) read requests originating from a processor, which could be in the same node as node server 201, or in a different node. A write request (regardless of its source), or a read request originating from an I/O device, has a lower priority than a processor read request, and always uses the queued path.

A memory read access request arriving from a local processor (i.e., arriving on a processor port 606) or from a remote processor in another node (i.e. arriving on a scalability port 607) is routed simultaneously to pending queue 602 (the queued path) and to address translation logic 603 (the direct and performance paths). Thus, the memory access proceeds down the performance or direct path at the same time it is processed in pending queue 602. Among other things, the pending queue is used for determining whether certain conflicts at a higher system level exist with respect to the memory access. For example, where a read request conflicts with an outstanding bus command (e.g., accesses an address for which a write is pending), the read request must wait in the pending queue for completion of the conflicting bus command. Additionally, where a read request from a processor requests data residing in another node, neither the performance path nor the direct path is used. In these and other cases, logic in the pending queue eventually detects that the memory access via the performance path or direct path should not be allowed to proceed. This determination is made while the memory read access is proceeding down the performance or direct path, and in some cases the memory read access will be transmitted on a local memory bus 207 to the memory modules themselves before the pending queue can make the determination. Once the pending queue makes such a determination, it sends a cancel signal to cancel further progress of the memory read access. If the data has already been read from memory, it is discarded.

A queued read request, when dispatched from the pending queue, passes through real-to-physical address translation logic 622, corresponding latch 623, and address decode logic 626 to reach an appropriate memory port 609, the port being selected by port decode logic 620 and corresponding latch 621. A queued write request passes through real-to-physical address translation logic 624, latch 625, and address decode logic 627, to a write queue (separate from a read queue) in the appropriate memory port.

Where the real address of the memory access references data in a remote node, the pending queue accesses remote cache directory 601 to determine whether a local copy of the data exists in a remote cache portion 512 of the local physical memory space. The remote cache is preferably an N-way associative cache, where N is a configurable parameter. If a local copy does exist, the remote cache directory is used to translate the real address to a local physical address. The memory access is then output from read interface of pending queue 602 to latch 623 (by-passing real-to-physical address translation logic 622) or from write interface of pending queue 602 to latch 625 (by-passing real-to-physical address translation logic 624), as the case may be.

In both the performance path and the direct path, the address passes through real-to-physical translation logic 612 or 613, corresponding latch 615 or 616, and address decode 618 to reach an appropriate memory port 609, the port being selected by port decode logic 614 and corresponding latch 617. The performance path and the direct path are similar, except that the performance path concurrently passes part of the address through fast partial decode 611 to an appropriate memory port, the partially decoded information from decode 611 arriving in the memory port ahead of the remaining address information from decode 618 to facilitate an earlier start of the memory access.

Node decode logic 604 determines the node in which the corresponding real address resides. As explained above with reference to the address mapping of FIG. 5, the node can be determined from the selective high order real address bits and the known boundaries of local memory portions 502-5 of real address space. Node decode logic outputs the decoded node to pending queue 602, where it is associated with the corresponding read request. If the node decode logic 604 determines that the decoded node is the node of node server 201, then the read request is potentially eligible for the performance path or the direct path. In this case, node decode logic outputs a path enable signal to path control logic 616. If the node decode logic determines that the decoded node is a different node, then the path signal is disabled.

In the performance or direct path, real-to-physical address translation logic 612 or 613 converts the real address in the memory access request to a corresponding physical address. As explained previously, the low order 26 bits of real address are identical to the low order 26 bits of physical address, so it is only necessary to translate bits above bit 26. Because node decode logic 604 separately verifies whether the real address maps to a local memory portion 502-5 assigned to the node of node server 201, real-to-physical address translation logic 612 or 613 speculatively assumes that the input real address is in the local node. The translated physical address is received in a latch. Concurrently, port decode logic 614 derives a memory port number from the real address and latches it.

The physical address produced by real-to-physical address translation logic 612 or 613 is then decoded by address decode logic 618 to produce a chip select group, internal bank, row and column for the memory access. This is not necessarily a direct mapping of physical address bits to selector bits for some physical parameter. As explained herein, the address bits used to identify certain physical parameters, particularly columns, will vary with the memory configuration. Therefore, address decode logic 618 may be quite complex, involving multiple logic gate delays.

Path control logic 619 routes the output of address decode logic 618 to an appropriate memory port based on the output of port decode logic 614 or 620.

Fast partial decode logic 611 determines a physical internal bank 303 and row 304 to which the memory access is directed. An internal bank 303 is the largest unit of memory sharing common row access logic 306. As is known in the art, typical DRAM technologies require multiple chip cycles to decode and enable a row for memory access, and access a memory cell within the row. Row access logic 306 is capable of accessing only a single row within its bank during this time interval. Fast partial decode logic 611 provides an early determination of the bank to which a read access is directed in order to begin the memory access.

An internal bank is determined by the memory port 609 driving a memory bus 207, chip select group 301 attached to that memory bus, and internal bank 303 within that chip select group. In accordance with the preferred embodiment, in at least some address mappings (herein designated performance maps), the memory port number, chip select group number, and internal bank number are derived directly from fixed address bits. These address bits are the same for a variety of mappings, i.e., for a variety of different memory module parameters. Moreover, these fixed address bits lie entirely in the lower order 26 bits of address, so that they are the same whether the address is a real address or a physical address. As a result, it is not necessary to first translate a real address to a physical address for input to fast bank decode logic 611, nor is it necessary to first determine the memory configuration. The internal bank decode information is taken almost directly from address bits, and is available very quickly to the memory port (i.e., at least one clock cycle before the full address is decoded). With this information, logic in the memory port can determine whether there is an outstanding memory access to the same bank, which might require the operation to wait briefly in the read queue of the memory port. In the performance map, many of the row address bits are consistent across different configurations, although some require decoding. The row number decoded by fast partial decode 611 is therefore available after the bank decode information, although before the column decode produced by address decode 618. With the row decode provided to the memory port, the port can transmit the row access information to the corresponding memory modules for initiating the row access. The decoded column number is transmitted to memory in a later cycle, after it is available from decode 618. The performance mappings of the preferred embodiment are explained in greater detail herein.

Fast partial decode 611 decodes the memory port from the designated port bits of the real address and uses the port number as a control for selector logic which outputs the chip select number, internal bank number and row number directly to the corresponding memory port 609. The output of fast partial decode logic 611 is speculative in the sense that the logic does not verify the node (does not verify that the real address of the memory access is in the local node), and does not verify that there is no conflicting memory access. As explained above, pending queue 602 and node decode 604 perform these determinations, and will terminate the memory access downstream if the memory access should not proceed.

In the preferred embodiment, there are two alternative sets of mappings of physical address bits to memory parameters such as port number, chip select group, internal bank, row and column, herein referred to as a performance map and a general map. Each node 101 in system 100 is independently configured to use one map or the other, all local memory 103 within a particular node using maps of the same set, i.e., either performance maps or general maps, but never a mixture of the two.

The general map supports a greater variety of memory configuration options. For example, using the general map it is possible for local memory within the same node to use memory modules of different sizes, or having different parameters such as the number of internal banks, rows or columns. It is also possible to have a different amount of memory attached to different memory buses 207 within the same local node. It is further possible to configure memory on any number of memory ports 207, including three memory ports. As a result of these various supported configurations, the logic required in address decoders 618, 626 or 627 for decoding a physical address to memory parameters is relatively complex. Because memory configurations on different ports may vary, the address translation logic must determine the port being accessed before it can determine the applicable map from the set of general maps, and subsequently decode the address based on the applicable map. This complexity makes it impossible to use the simplified decode logic of fast bank decode 611, and so the chip select group and internal bank are unavailable to the memory port 609 until the physical address has been fully decoded by one of address decoders 618, 626 of 627.

A node using the performance map is more constrained with respect to configuration options. Specifically, in order to use the performance map, all memory modules in local memory 103 must have identical addressing parameters. Additionally, the amount of memory in each chip select group 301 and number of chip select groups attached to each local memory bus 207 must be the same. Furthermore, the number of configured ports and certain other devices is constrained to a limited number of powers of 2, and the range of supported chip sizes is reduced. Specifically, in the preferred embodiment, a performance map is supported only for either two or four configured memory ports, and for either 4 or 8 chip select groups on each port, and for chip sizes of 256(×4)Mb, 512(×4)Mb, 1024(×4)Mb, or 2048(×4)Mb. These are generally the larger memory configurations. If a different number of ports is configured or chip select groups is attached to each port, or smaller memory modules are used, the general map must be used. Although address translation logic 603 supports multiple memory configurations using different respective performance maps from the set of performance maps, all memory in the node must be configured to a single map at any one time. These constraints make it possible to use a simplified mapping of physical address to memory parameters, in which certain parameters, such as port, bank, and chip select, are derived directly from consistent bit positions of the physical address, regardless of the configuration, and the decode of the row select is significantly simplified. When the local memory is configured according to a performance map, fast bank decode logic 611 is used to derive the port, bank, chip select, and row.

The use of address map sets having fixed bit positions for critical addressing parameters can be understood by reference to FIGS. 7A-B, 8A-D and 9A-B FIGS. 7A and 7B are a partial set of address maps for a variety of different memory configurations, using typical prior art techniques. FIGS. 8A-8D represent a partial set of performance maps in accordance with the preferred embodiment of the present invention. FIGS. 9A-9B represent a partial set of general address maps in accordance with the preferred embodiment. It will be understood that FIGS. 7A-7B, 8A-8D and 9A-9B represent only representative portions of full sets of maps for illustrative purposes; the actual number and range of different configurations supported is larger than represented by the maps shown in the figures, although constructed similarly.

In the mappings of FIGS. 7A-7B, 8A-8D and 9A-9B each row represents a particular memory configuration, and each column a bit of the physical address. The entries within the mapping tables show the significance of the particular bit of physical address for the particular memory configuration, i.e., the meaning of that bit when decoded to a physical memory parameter. The abbreviation "Rn" means Row select bit n, where the row is a row 304 of one or more memory chip. The abbreviation "Cn" means Column select bit n, where the column is a column 305 of one or more memory chips. The abbreviation "Bn" means bank select bit n, where the bank is an internal memory bank 303. The abbreviation "CS" means the chip select bit or bits for selecting a chip select group 301, and "port" designates the bits for selecting a port 609. The C10 select bit does not appear in the maps because it is not used for column selection, but as a control for row precharging.

FIG. 7A represents a mapping subset for two configured memory ports, 16-byte data interface, and 64-byte cacheline size (i.e., burst length of 4), for a particular family of memory chips designated DDR-II, having various sizes as shown. FIG. 7B represents a mapping subset for four configured memory ports, in which the other parameters are the same as in FIG. 7A. In both these maps, the number of chip select groups can vary from one to eight, the required chips select bits being placed above the column select bits; although the maps show three bits for the chip select group, where fewer than five groups are configured, it is not necessary to use all three bits.

The difficulty of decoding address maps should be apparent from examination of the maps of FIGS. 7A and 7B. The four lowest order address bits 00-03 are not needed for memory access, because the data interface (bus width) is 16 bytes, and all memory accesses are on this 16-byte boundary. The next two bits 04 and 05 are mapped to columns 0 and 1, respectively, to support a burst length of 4 (i.e., a burst of four 16-byte segments, making a total cacheline size of 64). Above bit 05, the address bits are mapped successively to the port, internal bank, row, column and chip select group. Due to variations in the values of various memory parameters, the number of bits needed to specify these parameters varies. As a result, the physical address bits do not map consistently to memory parameters. For example, in FIG. 7A, bank select 0 (B0) is derived from address bit 07, but in FIG. 7B it is derived from address bit 08. The mapping even varies within a subset. As shown in FIG. 7A, the lowest chip select (CS) bit might be derived from address bits 31, 32, 33 or 34. Because the physical memory bank and row of the data access can not be determined without the chip select, an access can not begin until the entire address has been decoded to obtain the chip select. As the number of different supported configurations increases, this decoding complexity is exacerbated.

FIG. 8A shows a mapping subset for two configured memory ports, four chip select groups, 16-byte data interface, and 64-byte cacheline size (i.e., burst length of 4), for a particular family of memory chips designated DDR-II, having various sizes as shown. FIG. 8B represents a mapping subset for eight chip select groups, in which the other parameters are the same as the subset of FIG. 8A. FIG. 8C represents a mapping subset for four ports, in which the other parameters are the same as the subset of FIG. 8A. FIG. 8D represents a mapping for four ports, in which the other parameters are the same as the subset of FIG. 8B. The mapping subsets of FIGS. 8A and 8B decode the same memory configurations as the prior art mapping subset of FIG. 7A, and the mapping subsets of FIGS. 8C and 8D decode the same memory configurations as the mapping subset of FIG. 7B (except that prior art subsets support a wider range of chips select groups).

Referring to the maps of FIGS. 8A-8D, it will be seen that the internal bank, port, and chip select group occupy consistent bit positions. I.e., for all configurations shown, the internal bank select is derived from address bit positions 06 and 07, and, where a third back select is required, from bit position 10; the low order port select bit is always derived from address bit 08. The high order port select bit, where needed (i.e., where four ports are configured) is always derived from address bit 09. The lowest order CS bit is always derived from address bit 20, the second order CS bit from address bit 21, and the third (where needed) is derived from address bit 22.

All of these address bits reside below address bit 26, i.e., are the same whether the address is a real address or a physical address. Therefore, the CS, internal bank and port can be taken directly from the real address, without first translating to a physical address. Furthermore, they are taken directly from the address bits themselves, without complex decoding of the configuration.

A similar consistency is applied to row and column selects to the extent possible. Since the row select has a higher priority than the column select, consistency in the row select is more desirable. As shown in the maps of FIGS. 8A-8D, row select bits 1-9 (R1-R9) are consistently derived from address bits 11-19, and row select bits 10-12 (R10-R12) are consistently derived from address bits 23-25, all of which are below bit 26, and therefore the same for real and physical addresses. Only three row select bits, R0, R13 and R14, are not derived from consistent address bits.

Even some of the column select bits are consistently derived, e.g. bits C4-C7. Since these are derived from address bits above bit 25, they can not be obtained directly from the real address. However, the use of consistent address bits simplifies the logic required in address decode 618.

FIG. 9A shows a mapping subset for two configured memory ports, 16-byte data interface, and 64-byte cacheline size (i.e., burst length of 4), for DDR-II memory chips, having various sizes as shown. FIG. 9B represents a mapping subset for four ports, in which the other parameters are the same as the subset of FIG. 9A. The mapping subsets of FIGS. 9A and 9B decode the same memory configurations as the prior art mapping subsets of FIGS. 7A and 7B, respectively.

The general principle of consistent decoding of address bits has been applied to the general maps of FIGS. 9A-9B. However, because the general maps support a wider variety of configurations with fewer constraints, it is not possible to obtain the same degree of consistency as in the performance maps of FIGS. 8A-8D, particularly with respect to chip select (CS) bits. In the general case, a memory configuration may have a different amount of total memory attached to each port. This makes it difficult or impossible to derive the CS bits from the middle of the memory map, because this could leave gaps in the address space. For this reason, the CS bits are taken from the highest order bits of used memory address, which inevitably means that the CS bit positions are inconsistent. It also means that the CS bits must be derived from the physical address, after it has been translated from the real address.

Although FIGS. 8A-8D and 9A-9B show specific mappings embodying the general principles of the present invention, it will be appreciated that numerous alternative mappings of specific bits could be used in accordance with the present invention. It will further be appreciated that the number of ports, internal banks, chip select groups and similar parameters may vary, and in particular that as memory chips sizes grow or other architectural aspects of computers evolve, other or different parameters may be used.

In the preferred embodiment, two sets of address maps are used, in which a constrained (performance) set is able to achieve greater consistency of address bit correspondence to physical parameter than a general address map. However, a computer system in accordance with the present invention might have only a single set of address maps.

In the preferred embodiment as described above, a computer system contains multiple nodes and a main memory which is distributed among the various nodes, requiring real memory address to be mapped to local physical memory address. However, a method and apparatus for accessing memory in accordance with the present invention is not necessarily limited to use in a nodal or NUMA architecture, and in an alternative embodiment, different system architectures may be used. Furthermore, a system in accordance with the present invention need not use a translation of real to physical addresses, and it is possible, even where a nodal architecture is used, that there will be only a single real address space for the entire system. It is also possible that, where there is a translation of real addresses to local nodal addresses, the local nodes will not contain remote caches or similar structures.

Although a specific embodiment of the invention has been disclosed along with certain alternatives, it will be recognized by those skilled in the art that additional variations in form and detail may be made within the scope of the following claims:

What is claimed is:

1. A memory controller for a digital device, comprising:
   an interface for communicating with a plurality of memory modules embodying an addressable memory;
   logic receiving memory addresses for processing by said digital device;
   memory access logic which accesses memory locations in said addressable memory responsive to receiving said memory addresses, said memory access logic supporting a plurality of different configurations of said memory modules embodying said addressable memory and, for each said configuration of said memory modules, decoding a memory address to a plurality of physical parameter selections representing physical parameters of said addressable memory according to a respective corresponding decoding map of a plurality of decoding maps, said plurality of physical parameter selections including a row select and a column select representing a row and column respectively of memory cell arrays in said memory modules embodying said addressable memory;
   wherein, for a first subset of said plurality of different configurations of said memory modules, said first subset being fewer than all of said plurality of different configurations of said memory modules, said memory access logic produces a decoded selection of a first subset of said plurality of physical parameter selections according to the decoding map corresponding to the configuration, said first subset of physical parameter selections not including said column select, said first subset of physical parameter selections being decoded from at least a portion of said memory address, before said memory access logic produces said column select from at least a portion of said memory address; and
   wherein, for a second subset of said plurality of different configurations of said memory modules, said second subset being fewer than all of said plurality of different configurations of said memory modules, said first and second subsets of said plurality of different configurations of said memory modules being disjoint, said memory access logic produces a decoded selection of said first subset of said plurality of physical parameter selections according to the decoding map corresponding to the configuration at substantially the same time that said memory access logic produces said column select from at least a portion of said memory address.

2. The memory controller of claim 1,
   wherein said digital device comprises a main memory which is distributed as a plurality of local memories, each local memory being accessed using a separate respective memory controller;
   wherein said main memory is addressable using real addresses, each real address specifying a unique data location in said main memory; and
   wherein each said memory controller translates real addresses to corresponding local addresses, each local address specifying a unique data location in the respective local memory associated with each memory controller, wherein at least some local addresses are duplicated in different local memories.

3. The memory controller of claim 2,
   wherein a first subset of address bits of each said local address is identical to a first subset of address bits of the corresponding real address from which the local address was translated;
   wherein a first subset of decode logic decodes each said first subset of address bits of a respective real address to a corresponding said first subset of said plurality of physical parameter selections, each said first subset of address bits of a respective real address being input to said first subset of decode logic before the respective real address is translated to a corresponding local address; and
   wherein a second subset of decode logic decodes at least a portion of said corresponding local address to said column select after the respective real address corresponding to said corresponding local address is translated to said corresponding local address.

4. The memory controller of claim 1, wherein said first subset of said plurality of physical parameter selections comprises at least one of the set consisting of: (a) a memory port select, (b) a memory chip group select; and (c) an internal memory bank select.

5. A digital data processing system, comprising:
   at least one processor;
   a plurality of memory modules embodying a main memory;
   a communications medium for communicating data between said at least one processor and said main memory; and
   memory access control logic controlling access by said at least one processor to said main memory, said memory access control logic supporting a plurality of different configurations of said memory modules embodying said main memory and, for each said configuration of said memory modules, decoding a memory address to a plurality of physical parameter selections representing physical parameters of said main memory according to a respective decoding map of a plurality of decoding maps;
   wherein said memory access control logic comprises first decode logic and second decode logic, said first decode logic decoding a first portion of said memory address to a first subset of said plurality of physical parameter selections according to a first subset of said plurality of decoding maps, said first subset of decoding maps being fewer than all of said plurality of decoding maps, said second decode logic decoding said first portion of said memory address to a second subset of said plurality of physical parameter selections according to a second subset of said plurality of decoding maps, said second subset of decoding maps being fewer than all of said plurality of decoding maps, said first and second subsets of said plurality of decoding maps being disjoint;
   wherein said first decode logic produces said first subset of said plurality of physical parameter selections from an input memory address with less delay than second decode logic produces said second subset of said plurality of physical parameter selections from an input memory address.

6. The digital data processing system of claim 5,
wherein said first portion of said memory address is less than all of said memory address; and
wherein said second decode logic further decodes a second portion of said memory address different from said first portion according to said first subset of said plurality of decoding maps and said second subset of said plurality of decoding maps.

7. The digital data processing system of claim 5,
wherein said first subset of physical parameter selections are decoded from consistent bit positions of said memory address for a plurality of different said configurations of said memory modules according to said first subset of decoding maps; and
wherein said second subset of physical parameter selections are not decoded from consistent bit positions of said memory address for a plurality of different said configurations of said memory modules according to said second subset of decoding maps.

8. The digital data processing system of claim 5,
wherein said system comprises a plurality of processors;
wherein said main memory is distributed as a plurality of local memories, each local memory being associated with one or more respective processors of said plurality of processors; and
wherein said memory access control logic is distributed as a plurality of local memory controllers, each local memory controller being associated with a respective one of said plurality of local memories.

9. The digital data processing system of claim 8,
wherein each said processor generates real addresses of corresponding main memory locations to be accessed, each real address specifying a unique data location in said main memory; and
wherein each said local memory controller translates real addresses generated by processors to local addresses, each local address specifying a unique data location in the respective local memory associated with each local memory controller, wherein at least some local addresses are duplicated in different local memories.

10. The digital data processing system of claim 5, wherein said first subset of said plurality of physical parameter selections comprises at least one of the set consisting of: (a) a memory port select, (b) a memory chip group select; and (c) an internal memory bank select.

* * * * *